United States Patent
Ma (10) Patent No.: US 10,110,375 B2
(45) Date of Patent: Oct. 23, 2018

(54) CRYPTOGRAPHIC DEVICE AND SECRET KEY PROTECTION METHOD

(71) Applicant: MStar Semiconductor, Inc., Hsinchu Hsien (TW)

(72) Inventor: Ching-Wen Ma, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 376 days.

(21) Appl. No.: 14/278,318

(22) Filed: May 15, 2014

(65) Prior Publication Data

US 2016/0119136 A1    Apr. 28, 2016

(30) Foreign Application Priority Data

May 23, 2013    (TW) .............................. 102118148 A (51) Int. Cl.
*H04L 9/06* (2006.01)
*H04L 9/00* (2006.01)

(52) U.S. Cl.
CPC ............ *H04L 9/0643* (2013.01); *H04L 9/003* (2013.01); *H04L 2209/046* (2013.01); *H04L 2209/08* (2013.01); *H04L 2209/16* (2013.01)

(58) Field of Classification Search
None
See application file for complete search history.

(56) References Cited

U.S. PATENT DOCUMENTS

| | | | | |
|---|---|---|---|---|
| 4,908,038 A | * | 3/1990 | Matsumura | G06Q 20/341 235/375 |
| 5,680,462 A | * | 10/1997 | Miller | H04L 9/001 380/263 |
| 5,982,895 A | * | 11/1999 | Dworkin | G06F 7/726 380/271 |
| 6,157,723 A | * | 12/2000 | Schultz | H04L 9/088 380/249 |
| 6,298,442 B1 | * | 10/2001 | Kocher | G06F 7/723 380/28 |
| 6,327,661 B1 | * | 12/2001 | Kocher | G06F 21/602 380/28 |

(Continued)

FOREIGN PATENT DOCUMENTS

| | | |
|---|---|---|
| CN | 1423451 | 6/2003 |
| CN | 101242265 | 8/2008 |

(Continued)

OTHER PUBLICATIONS

Taiwan Patent Office, "Office Action," dated Jan. 28, 2015.

(Continued)

*Primary Examiner* — Lisa C Lewis
*Assistant Examiner* — Thanh T Le
(74) *Attorney, Agent, or Firm* — WPAT, PC (57) ABSTRACT

A cryptographic device and a secret key protection method are provided. The cryptographic device protects a secret key of the cryptographic device when processing a message. The cryptographic device includes: a secret key protection circuit, configured to generate an anti-crack protection signal according to the message and the secret key by a hash calculation circuit; and a cryptographic processor, configured to process the message and the secret key according to the anti-crack protection signal to generate an encrypted message.

16 Claims, 13 Drawing Sheets

(56) References Cited

U.S. PATENT DOCUMENTS

| | | | | |
|---|---|---|---|---|
| 6,748,410 B1* | 6/2004 | Gressel | G06F 7/728 | 708/491 |
| 7,092,523 B2* | 8/2006 | Pezeshki | G06F 7/725 | 380/28 |
| 7,107,566 B1* | 9/2006 | McElheny | G06F 17/5054 | 716/117 |
| 8,108,682 B2* | 1/2012 | Watanabe | H04L 9/0643 | 380/28 |
| 8,472,619 B1* | 6/2013 | Trimberger | H04L 9/002 | 380/28 |
| 8,842,824 B2* | 9/2014 | Yamashita | G09C 1/00 | 380/28 |
| 8,971,528 B2* | 3/2015 | Campagna | H04L 9/3252 | 380/28 |
| 9,075,798 B2* | 7/2015 | Schultz | G06F 17/30 | |
| 2002/0124178 A1* | 9/2002 | Kocher | G06F 7/00 | 713/193 |
| 2004/0162983 A1* | 8/2004 | Gotoh | H04L 9/0841 | 713/171 |
| 2005/0203582 A1* | 9/2005 | Healy | A61N 1/37211 | 607/31 |
| 2006/0023873 A1* | 2/2006 | Joye | G06F 7/535 | 380/28 |
| 2006/0159257 A1* | 7/2006 | Fischer | H04L 9/003 | 380/28 |
| 2007/0071235 A1* | 3/2007 | Fujisaki | H04L 9/003 | 380/28 |
| 2007/0110229 A1* | 5/2007 | Lablans | H03K 19/20 | 380/28 |
| 2008/0260147 A1* | 10/2008 | Shin | H04L 9/0637 | 380/46 |
| 2009/0097637 A1* | 4/2009 | Boscher | G06F 7/723 | 380/28 |
| 2010/0014670 A1* | 1/2010 | Li | H04L 9/3239 | 380/255 |
| 2011/0013767 A1* | 1/2011 | Kim | H04L 9/003 | 380/28 |
| 2011/0103583 A1* | 5/2011 | Yoon | H04L 9/302 | 380/255 |
| 2011/0202464 A1* | 8/2011 | Carbullido | G06F 21/305 | 705/50 |
| 2012/0110343 A1* | 5/2012 | Bandic | G06F 21/80 | 713/189 |
| 2012/0294439 A1* | 11/2012 | Choi | G06F 21/755 | 380/28 |
| 2012/0307997 A1* | 12/2012 | Endo | H04L 9/003 | 380/28 |
| 2013/0195266 A1* | 8/2013 | Fischer | H04L 9/003 | 380/44 |
| 2013/0268654 A1* | 10/2013 | Abraham | H04W 40/246 | 709/224 |
| 2013/0322629 A1* | 12/2013 | Zucchetti | B60C 23/0462 | 380/270 |
| 2014/0112468 A1* | 4/2014 | Yamashita | G09C 1/00 | 380/28 |
| 2014/0115405 A1* | 4/2014 | Condorelli | G06F 21/556 | 714/47.1 |
| 2014/0119537 A1* | 5/2014 | Legre | H04L 9/0852 | 380/28 |
| 2014/0223197 A1* | 8/2014 | Gueron | G06F 21/72 | 713/193 |

FOREIGN PATENT DOCUMENTS

| | | | | |
|---|---|---|---|---|
| CN | 201533251 U | * | 7/2010 | H02M 1/44 |
| CN | 201576940 U | * | 9/2010 | H02J 3/01 |
| CN | 201839495 U | * | 5/2011 | H03L 7/099 |
| TW | 200833054 | | 8/2008 | |
| TW | 201246889 | | 11/2012 | |

OTHER PUBLICATIONS

Zhiyuan Li, "Research on Differential Power Analysis Attacks and Countermeasures on RSA Cipher Circuits", May 5, 2009, University of Science and Technology of China.

State Intellectual Property Office of the People's Republic of China , "Office Action", dated Feb. 7, 2017.

* cited by examiner

CRYPTOGRAPHIC DEVICE AND SECRET KEY PROTECTION METHOD

This application claims the benefit of Taiwan application Serial No. 102118148, filed May 23, 2013, the subject matter of which is incorporated herein by reference.

BACKGROUND OF THE INVENTION

Field of the Invention

The invention relates in general to a cryptographic device and a secret key protection method, and more particularly to a cryptographic device and a secret key protection method that guard against side channel attacks to achieve anti-crack protection.

Description of the Related Art

Electronic communication is one main communication means in the modern society. To ensure electronic communication security, i.e., the privacy of electronic communication contents, electronic contents are encrypted by a key before being transmitted. In the earlier days, unauthorized interceptors used to obtain the key through large amounts of computations, or usurp the key through theoretical loopholes in cryptographic operations. However, as theories and applications of cryptography continue to progress, the acquisition of the key through direct cracking is also becoming increasingly impracticable. Certain unauthorized interceptors then collect side channel information (e.g., power consumption information, computation time information, sound information and electromagnetic wave information) that is revealed during computations of encrypted communication devices (e.g., IC smart cards and portable electronic devices), and statistically calculate and analyze the side channel information to identify the key. Such attacks are referred to as side channel attacks, and differential power analysis (DPA) among these side channel attacks is one that is considerably threatening. A defense measure against the differential power analysis includes two main approaches—hiding, and masking. The former approach renders the revealed power consumption information to be irrelevant to the actual computation processes as much as possible (e.g., by utilizing a design of equal amounts of power consumption or a design of additional disordered power consumption). The latter approach first performs logic calculations on a key or a message with a mask value, and then performs cryptographic calculations by utilizing the masked key or message. However, the hiding approach requires additional hardware circuits for fabricating balanced power consumption, and the masking approach involves independent random number sources to prevent from being cracked. That is, both approaches suffer from certain shortcomings.

SUMMARY OF THE INVENTION

The invention is directed to a cryptographic device and a secret key protection method for overcoming issues of the prior art.

The present invention discloses a cryptographic device that protects a secret key of the cryptographic device when processing a message. According to an embodiment of the present invention, the cryptographic device includes: a secret key protection circuit, configured to generate an anti-crack protection signal according to the message and the secret key by a hash calculation circuit; and a cryptographic processor, configured to process the message and the secret key according to the anti-crack protection message to generate an encrypted message. In the embodiment, the cryptographic processor changes a time point at which the secret is processed according to the anti-crack protection signal to generate the encrypted message Alternatively, the cryptographic processor processes the message and the secret key according to the anti-crack protection message to generate an anti-crack protection message and an anti-crack protection secret key, respectively, and then generates the encrypted message according to the anti-crack protection message and the anti-crack protection secret key.

The present invention further discloses a secret key protection method. The secret key protection method is applied to a cryptographic device to protect a secret key of the cryptographic device when the cryptographic device processes a message. According to an embodiment of the present invention, the secret key protection method includes: generating a hash value according to the message and the secret key; generating an anti-crack protection signal according to the hash value; and processing the message and the secret key according to the anti-crack protection signal to generate an encrypted message.

The above and other aspects of the invention will become better understood with regard to the following detailed description of the preferred but non-limiting embodiments. The following description is made with reference to the accompanying drawings.

DETAILED DESCRIPTION OF THE INVENTION

Technical terms of the application are based on general definition in the technical field of the application. If the application describes or explains one or some terms, definition of the terms are based on the description or explanation of the application.

The present invention discloses a cryptographic device and method as well as a secret key protection device and method for protecting a message and a secret key. The devices and methods, applicable to various encrypted communication devices such as chip ATM cards, chip identifications, portable communication devices (e.g., mobile phones, tablet devices and laptop computers), and fixed communication devices (e.g., desktop computers and smart TVs), are capable of preventing threats of side channel attacks to achieve information protection and/or communication security. In possible implementation, one skilled person in the art may choose equivalent elements or steps to implement the disclosure based on the disclosure of the application. That is, the implementation of the disclosure is not limited by the embodiments disclosed in the disclosure. Further, a part of the elements included in the cryptographic device and the secret key protection device of the disclosure are individually known elements. Without affecting the full disclosure and possible implementation of the devices, details of the known elements are omitted. Further, the cryptographic method and the secret key protection method may be implemented by the cryptographic device and the secret key protection device of the disclosure, respectively, or be implemented by other known or equivalent devices. Without affecting the full disclosure and possible implementation of the methods of the disclosure, the description of the methods focuses on the steps of the methods. One person skilled in the art may select appropriate devices or element combinations as hardware for performing the methods based on the details describing the methods in the disclosure.

Figure 1:
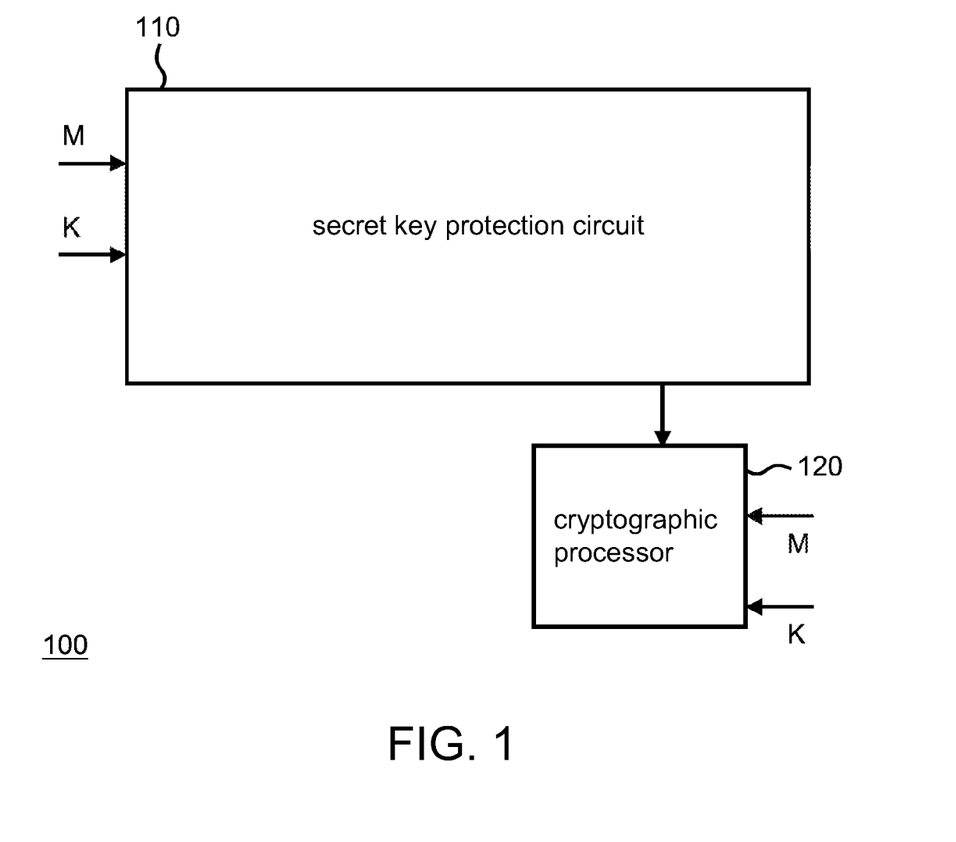
FIG. 1 is a schematic diagram of a cryptographic device according to an embodiment of the present invention.

FIG. 1 shows a schematic diagram of a cryptographic device according to an embodiment of the present invention. As shown in FIG. 1, a cryptographic device 100 of the embodiment includes a secret key protection circuit 110 and a cryptographic processor 120. The secret key protection circuit 110 generates an anti-crack protection signal according to a message (M) and a secret key (K). The message and the secret key are protection targets. Depending on different applications and requirements, in the present invention, the anti-crack protection signal may also be generated according to one of the message and the secret key. The cryptographic processor 120 processes the message and the secret key according to the anti-crack protection signal to generate an encrypted signal. In the embodiment, the cryptographic processor 120 may be realized by a known processor.

The cryptographic processor 120 changes a time point at which the secret key is processed according to the anti-crack protection signal to encrypt the message by the secret key, and accordingly generates the encrypted signal. Alternatively, the cryptographic processor 120 processes the message and the secret key according to the anti-crack protection signal to generate an anti-crack protection message and an anti-crack protection secret key, respectively, and generates the encrypted signal according to the anti-crack protection message and the anti-crack protection secret key. For example, based on characteristics of the anti-crack protection signal, the cryptographic processor 120 processes the secret key according to the anti-crack protection signal by a non-periodical, non-specific time point, non-predetermined parameter related, or stochastic approach to achieve an effect of hiding the time point at which the secret key is processed. Alternatively, the cryptographic processor 120 performs a masking operation (e.g., an exclusive OR calculation or other logic calculations) on the message and the secret key according to the anti-crack protection signal to generate the anti-crack protection message and the anti-crack protection secret key, respectively, and processes the anti-crack protection message by the anti-crack protection secret key to obtain the encrypted signal.

Figure 2A:
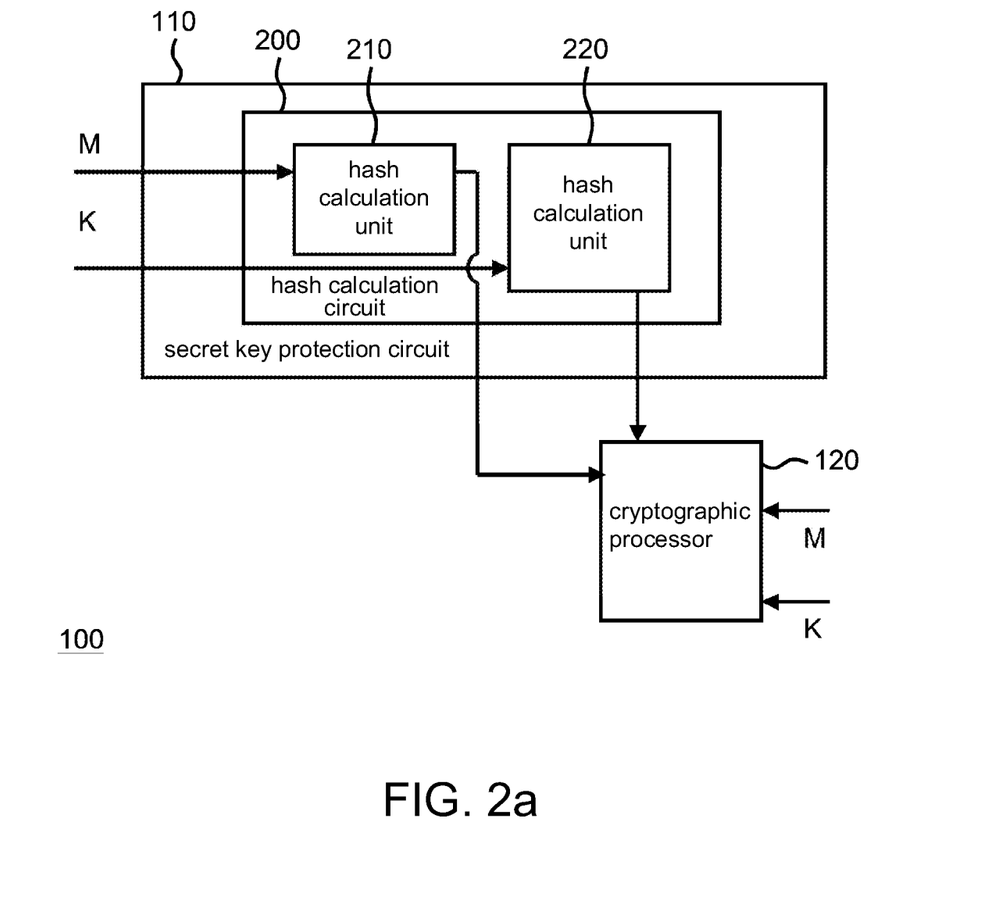
FIG. 2a is a schematic diagram of a secret key protection circuit in FIG. 1 according to an embodiment of the present invention.
Figure 2B:
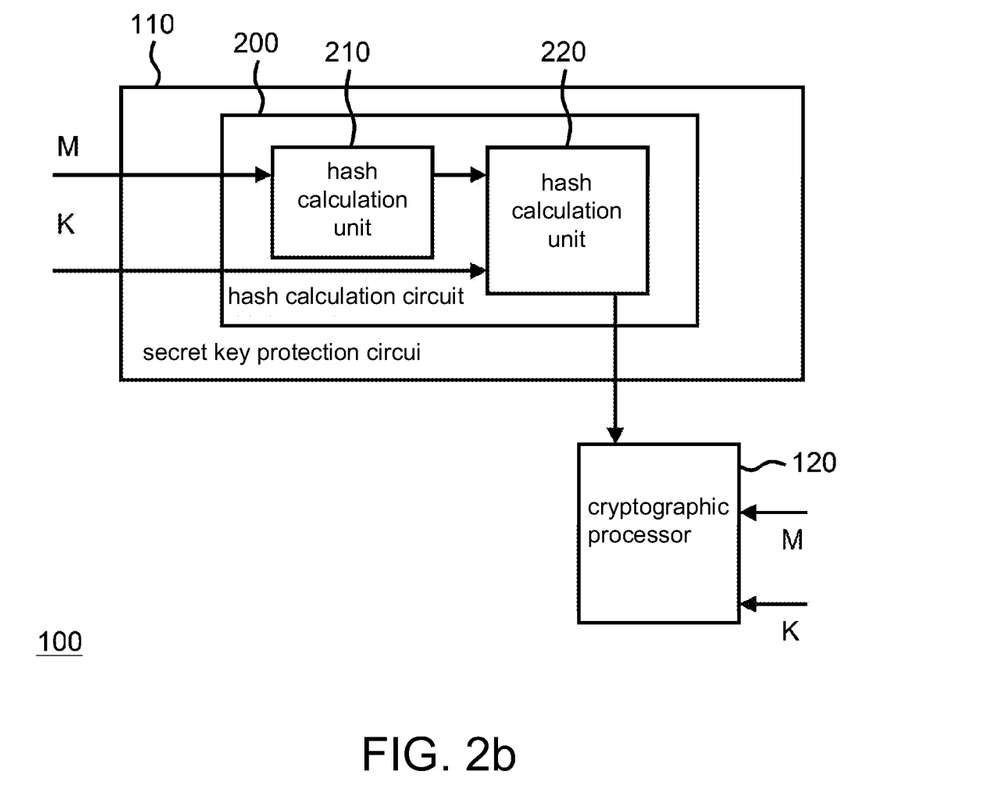
FIG. 2b is a schematic diagram of a secret key protection circuit in FIG. 1 according to another embodiment of the present invention.

Referring to FIG. 2a and FIG. 2b, in order to generate an appropriate anti-crack protection message for the cryptographic processor 120, the secret key protection circuit 110 according to an embodiment of the present invention includes a hash calculation circuit 200. The hash calculation circuit 200 generates at least one hash value according to the foregoing message and secret key. The at least one hash value is for generating or serving as the anti-crack protection signal. In the embodiment, the hash calculation circuit 200 includes a hash calculation unit 210 and a hash calculation unit 220. As shown in FIG. 2a, the hash calculation unit 210 generates a part of the at least one hash value according to the message, and the hash calculation unit 220 generates the other part of the at least one hash value to form the at least one hash value. Alternatively, as shown in FIG. 2b, the hash calculation unit 210 generates an initial hash value according to the message, and the hash calculation circuit 220 generates the at least one hash value according to the secret key and the initial hash value when the hash calculation unit 210 generates the initial hash value according to the message, or generates the at least one hash value according to the message and the initial hash value (not shown) when the hash calculation unit 210 generates the initial hash value according to the secret key. Depending on different applications and requirements, one person skilled in the art may utilize one or more hash calculation units to generate the at least one hash value to simplify the design or to enhance the security.

Figure 3:
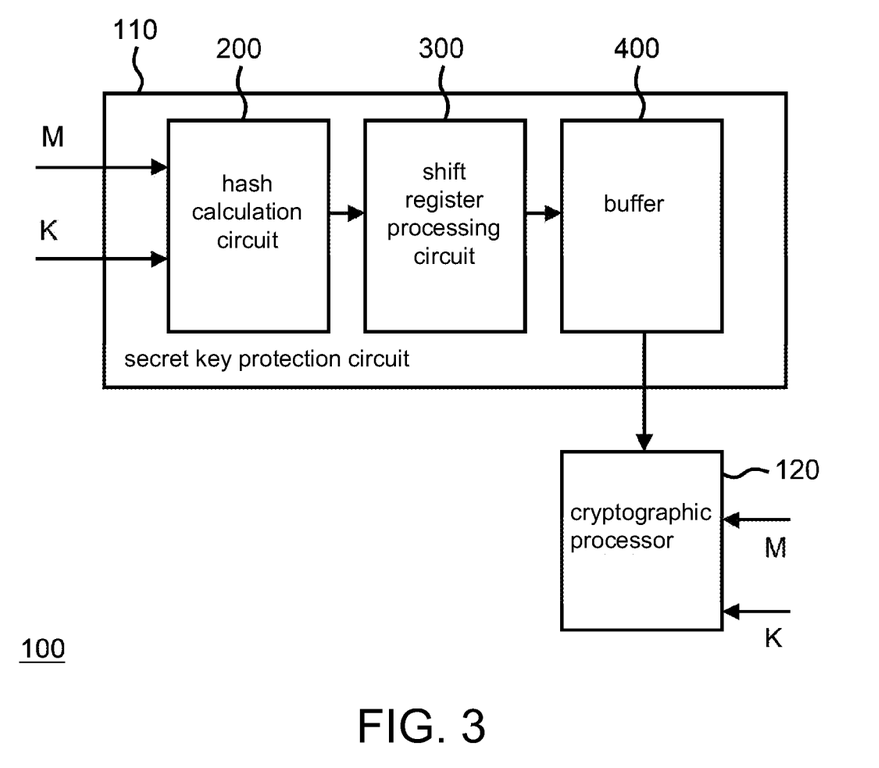
FIG. 3 is a schematic diagram of a secret key protection circuit in FIG. 1 according to another embodiment of the present invention.
Figure 4:
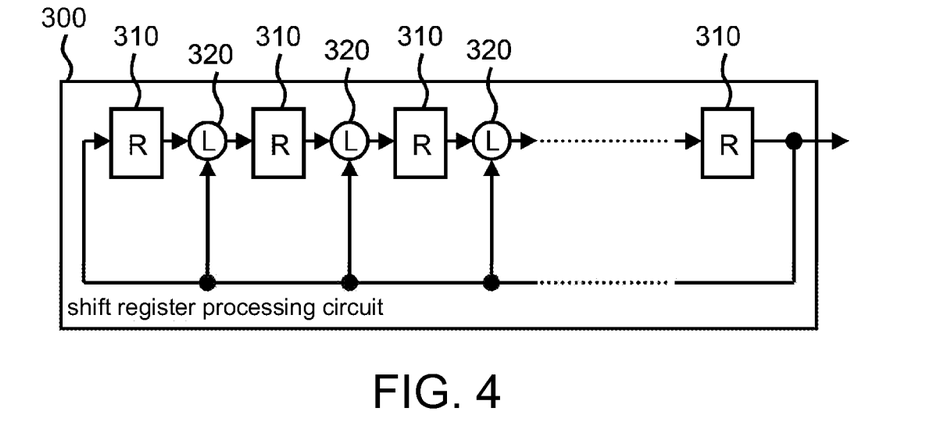
FIG. 4 is a schematic diagram of a shift register processing circuit in FIG. 3 according to an embodiment of the present invention.
Figure 5:
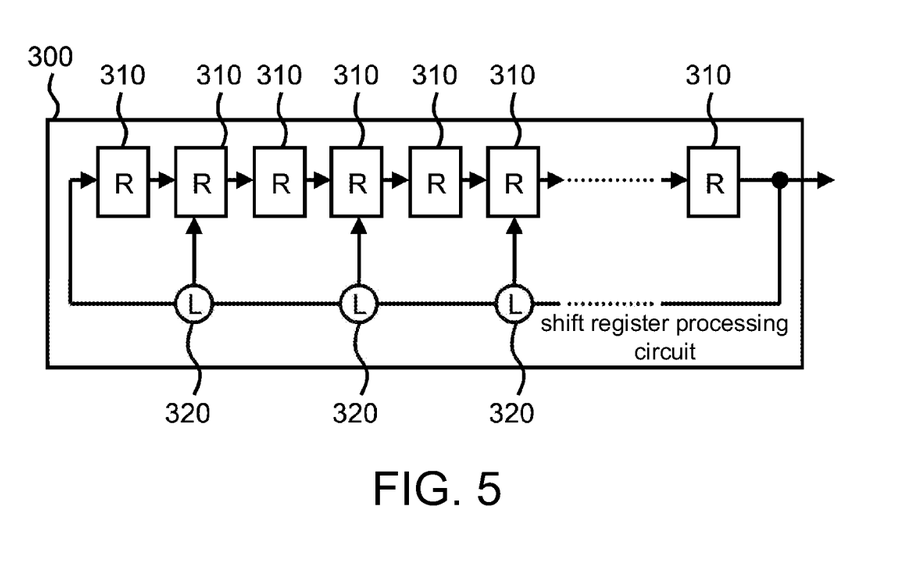
FIG. 5 is a schematic diagram of a shift register processing circuit in FIG. 3 according to another embodiment of the present invention.

Referring to FIG. 3, to ensure contents of the anti-crack protection signal are non-repetitive in order to increase a protection level for each message, the secret key protection circuit 110 may further include a shift register processing circuit 300 (e.g., a linear feedback shift register (LFSR)) and a buffer 400. The shift register processing circuit 300 generates the anti-crack protection signal according to the at least one hash value. The buffer 400 receives and stores the anti-crack protection signal outputted by the shift register processing circuit 300, and outputs the anti-crack protection signal to the cryptographic processor 120. For example, referring to FIG. 4, the shift register processing circuit 300 may include a plurality of register units (R) 310 and at least one logic calculation unit (L) 320 (e.g., a plurality of adders). The register units 310 include at least one input register unit (e.g., the first register units of the register units 310) that receives the at least one hash value, and at least one output register unit (e.g., the last register units of the register units 310) that outputs the anti-crack protection signal. The at least one logic calculation unit 310 generates a logic calculation value according to the at least one hash value or a derived value from the at least one hash value. The logic calculation value and the at least one hash value and the derived value are for generating the anti-crack protection signal. It should be noted that, the architecture of the shift register processing circuit 300 in FIG. 4 is for illustrative purposes, and other architectures as one shown in FIG. 5 may also be adopted by the present invention. Variations in the architecture of the shift register processing circuit 300 may be implemented by one person skilled in the art based on the disclosure of the present invention and known techniques of the technical field. Without affecting the full disclosure and possible implementation of the present invention, associated details are omitted herein. It should also be noted that, under appropriate designs or certain application conditions, given the shift register processing circuit 300 provides sufficient anti-crack protection, the shift register processing circuit 300 may also directly replace the foregoing hash calculation circuit 200 (the hash calculation circuit 200 at this point is non-necessary), and directly generate the anti-crack protection signal according to the message and the secret key. More specifically, at this point, the plurality of input register units are for respectively receiving the message and the secret key, the at least one logic calculation unit 320 is for generating the logic calculation value according to the message and the secret key or the derived value, and the logic calculation value together with the message and the secret key or the derived value are for generating the anti-crack protection signal.

Figure 6:
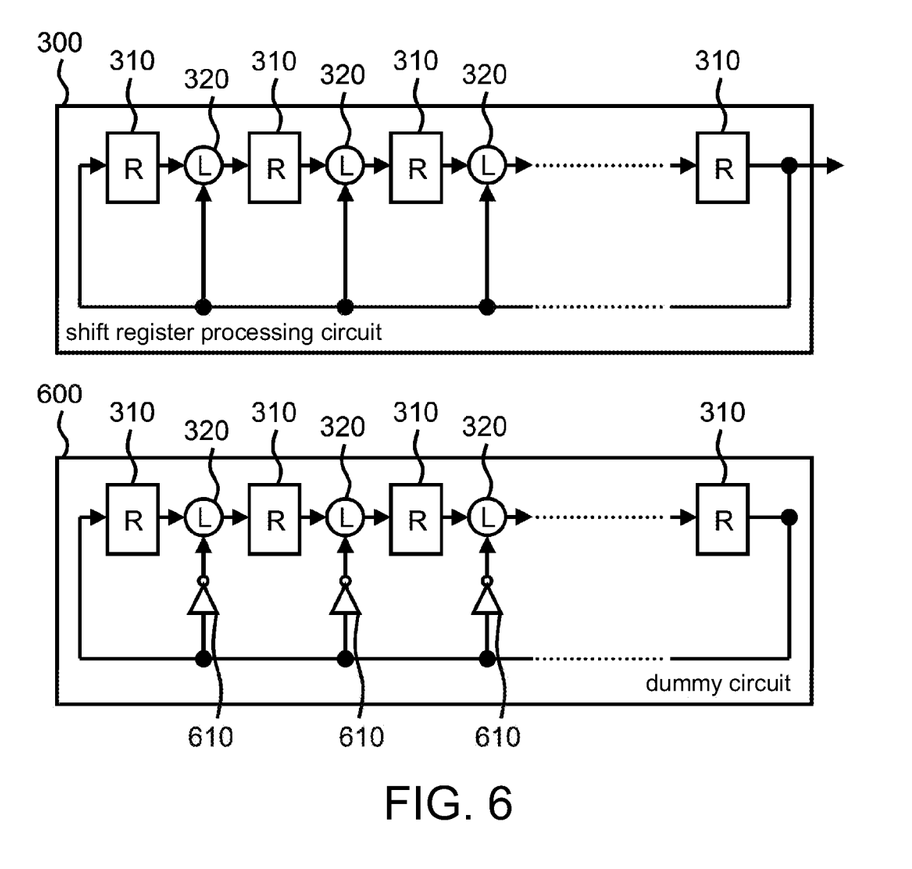
FIG. 6 is a schematic diagram of a dummy circuit of the shift register processing circuit in FIG. 4 according to an embodiment of the present invention.
Figure 7:
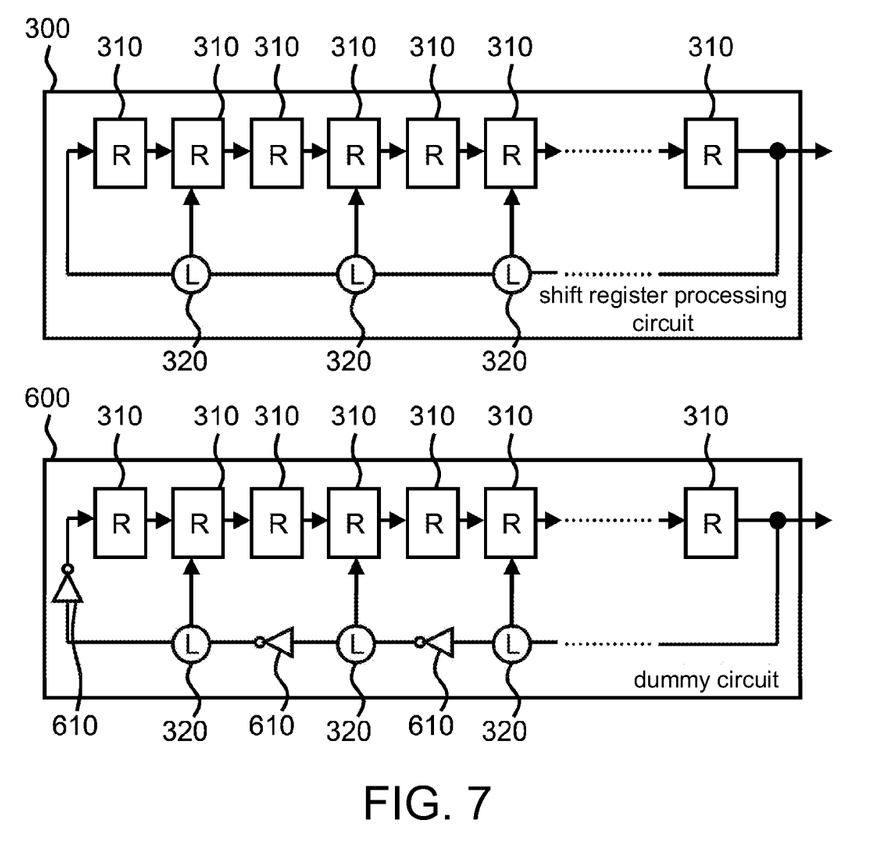
FIG. 7 is a schematic diagram of a dummy circuit of the shift register processing circuit in FIG. 5 according to an embodiment of the present invention.

Referring to FIG. 6 and FIG. 7 (respectively corresponding to FIG. 4 and FIG. 5), although the anti-crack protection signal is already utilized to protect the message and the secret key in the present invention, the secret key protection circuit 110 of the present invention may further include a dummy circuit 600. The dummy circuit 600 generates an energy distribution different from that of the shift register processing circuit 300. For example, the dummy circuit 600 generates an opposite energy distribution to that of the shift register processing circuit 300, so as to compensate the energy consumption of the shift register processing circuit 300. As such, it is made even more impracticable for unauthorized interceptors to analyze and obtain a correct value of the secret key through the revealed energy information. In the embodiment, a main difference of the dummy circuit 600 from the shift register processing circuit 300 is that the dummy circuit 600 includes a plurality of inverters 610 that achieve an effect of generating a different energy distribution. Such is an example for explaining the present invention, not limiting the present invention.

Figure 8:
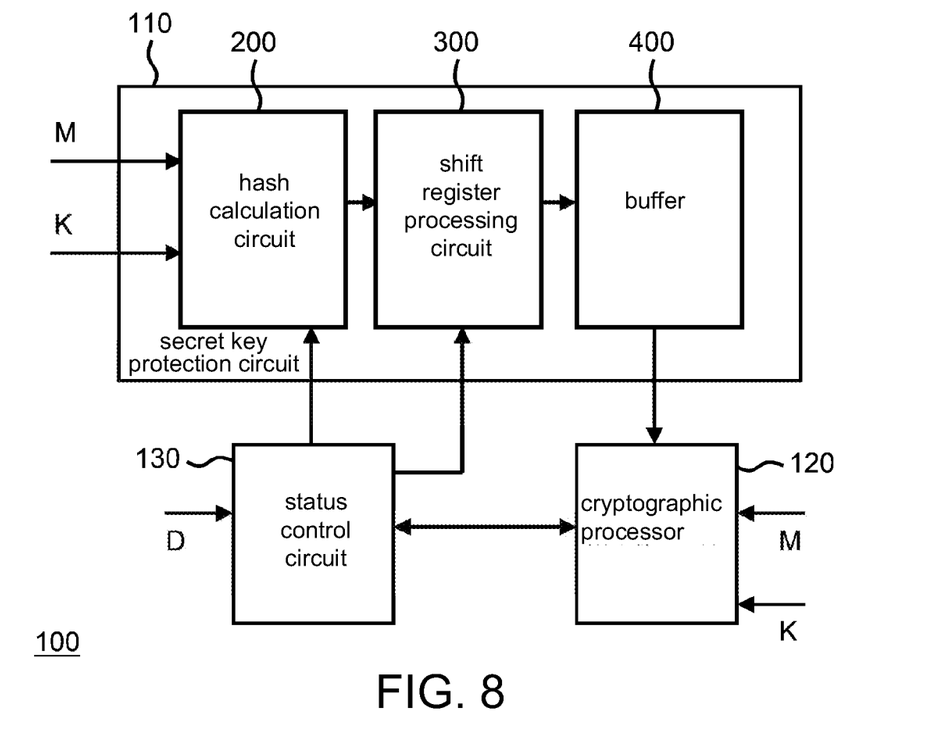
FIG. 8 is a schematic diagram of a cryptographic device according to another embodiment of the present invention.

Referring to FIG. 8, to coordinate operations of the secret key protection circuit 110 and the cryptographic processor 120, the cryptographic device 100 may further include a status control circuit 130, e.g., a finite state machine or an equivalent circuit. The status control circuit 130 controls the cryptographic processor 120 and/or the secret key protection circuit 130 according to a detection signal (D) and a predetermined condition. The detection signal indicates whether the message is present, and the predetermined condition corresponds to a predetermined time or a progress of generating the anti-crack protection signal. For example, the status control circuit 130 determines that a message is inputted according to the detection signal, the status control circuit 130 controls the hash calculation circuit 200 and the shift register processing circuit 300 of the secret key protection circuit 110 to generate the anti-crack protection signal according to the message and the secret key. After a predetermined sufficient time or having confirmed that the anti-crack protection signal is ready and complete (i.e., the foregoing predetermined condition is satisfied), the status control circuit 130 controls the cryptographic processor 120 to obtain the anti-crack protection signal from the secret key protection circuit 110, or controls the secret key protection circuit 110 to provide the anti-crack protection signal to the cryptographic processor 120 (not shown) to further perform the subsequent process for generating the anti-crack protection signal. When another message is later inputted, the above process is similarly performed. When the encrypted signal is generated and there is no other message inputted or other message to be processed, the status control circuit 130 may prompt the secret key protection circuit 110 and/or the cryptographic processor 120 to return to an idle state.

Figure 9:
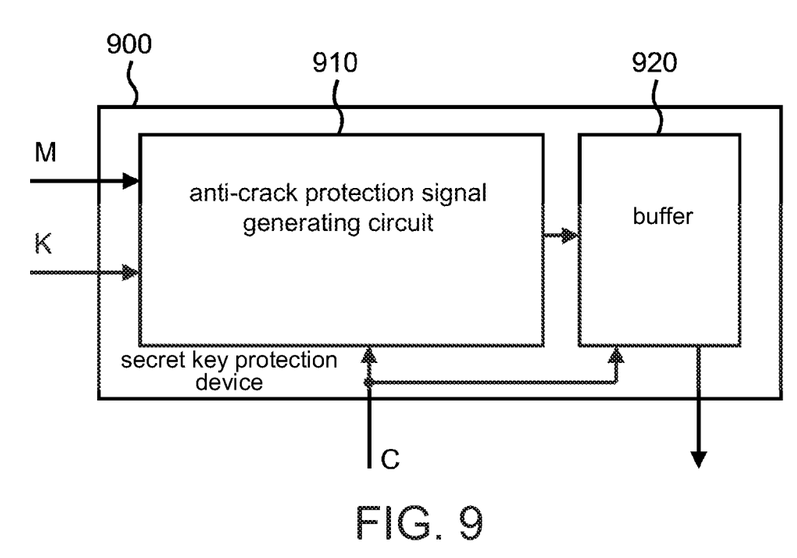
FIG. 9 is a secret key protection device according to an embodiment of the present invention.

In addition to the above cryptographic device 100, the present invention further discloses a secret key protection device. The secret key protection device generates an anti-crack protection signal according to a message (M) and a secret key (K). The anti-crack protection signal is for protecting the message and the secret key. As shown in FIG. 9, a secret key protection device 900 according to an embodiment includes an anti-crack protection signal generating circuit 910 that generates the anti-crack protection signal according to the message and the secret key, and a buffer 920 that outputs the anti-crack protection signal according to a control signal (C).

Figure 10:
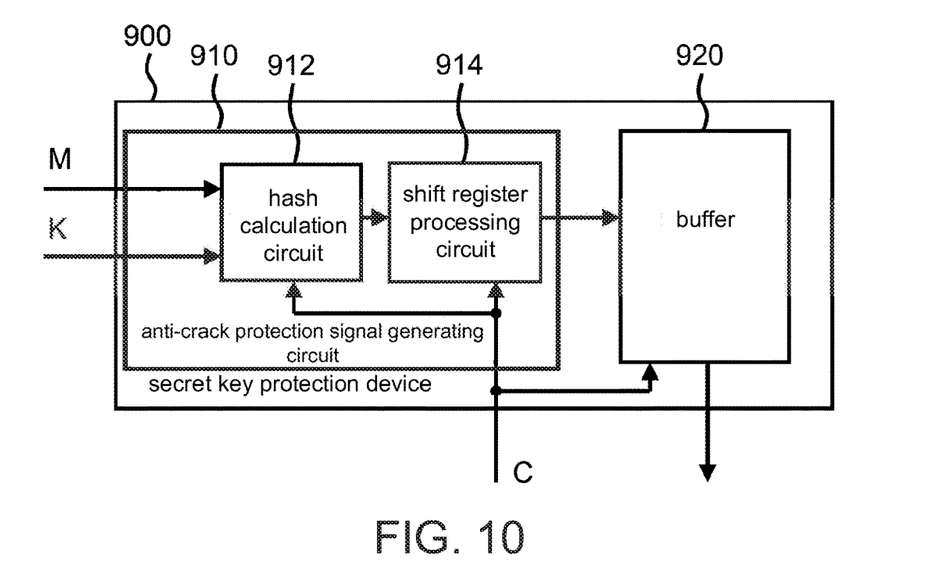
FIG. 10 is a schematic diagram of an anti-crack protection signal generating circuit in FIG. 9 according to an embodiment of the present invention.

In the embodiment, the anti-crack protection signal generating circuit 910 is equivalent to the secret key protection circuit 110 in FIG. 1. Thus, as shown in FIG. 10, the anti-crack protection signal generating circuit 910 may similarly include a hash calculation circuit 912 and/or a shift register processing circuit 914. The hash calculation circuit 912 generates at least one hash value according to the message and the secret key. The at least one hash value is for generating or serving as the anti-crack protection signal. The shift register processing circuit 914 generates the anti-crack protection signal according to the message and the secret key, or generates the anti-crack protection signal according to the at least one hash value. Operation details and variations of the hash calculation circuit 912 and the shift register processing circuit 914 are identical to those of the hash calculation circuit 200 in FIG. 2 and the shift register processing circuit 300 in FIG. 3, respectively, and such repeated description is omitted herein. The secret key protection device 900 may further include a status control circuit (e.g., the status control circuit 130 in FIG. 8). The status control circuit generates a control signal according to a detection signal and a predetermined condition, and accordingly controls the buffer 920 to output the anti-crack protection signal. The detection signal indicates whether the message is present, and the predetermined condition corresponds to a predetermined time or a progress of generating the anti-crack protection signal. One person skilled in the art can fully appreciate the operation details and variations of the status control circuit of the embodiment with reference to FIG. 8 and the associated description, and such repeated description is omitted herein.

Figure 11:
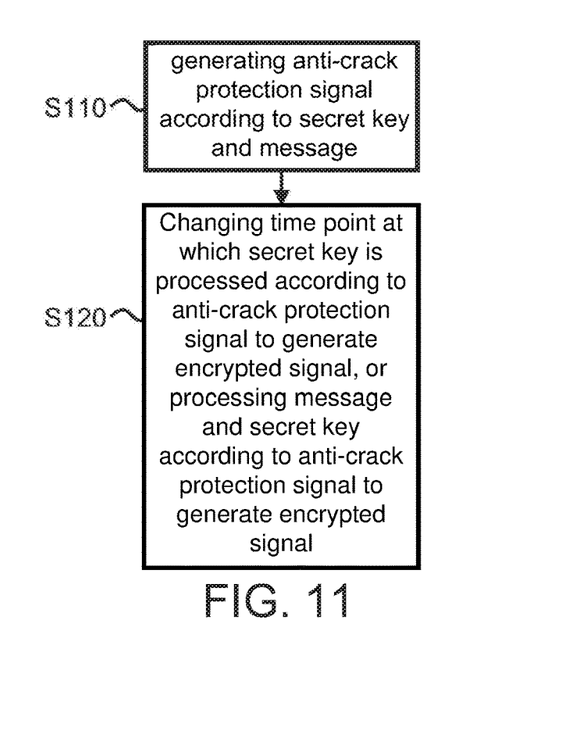
FIG. 11 is a flowchart of a cryptographic method according to an embodiment of the present invention.

The present invention further discloses a cryptographic method for protecting a message and a secret key. The cryptographic method may be realized by the cryptographic device 100 in FIG. 1 or an equivalent device. As shown in FIG. 11, the cryptographic method according to an embodiment includes steps S110 and S112.

In step S110, an anti-crack protection signal is generated according to a message and a secret key. This step may be performed by the secret key protection circuit 110 in FIG. 1 or an equivalent circuit.

In step S120, a time point at which the secret key is processed is changed according to the anti-crack protection signal to generate an encrypted message; alternatively, the message and the secret key are processed according to the anti-crack protection signal to generate an anti-crack protection message and an anti-crack protection secret key, respectively, and the encrypted signal is generated according to the anti-crack protection message and the anti-crack protection secret key. This step may be performed by the cryptographic processor 120 in FIG. 1 or an equivalent circuit.

Figure 12:
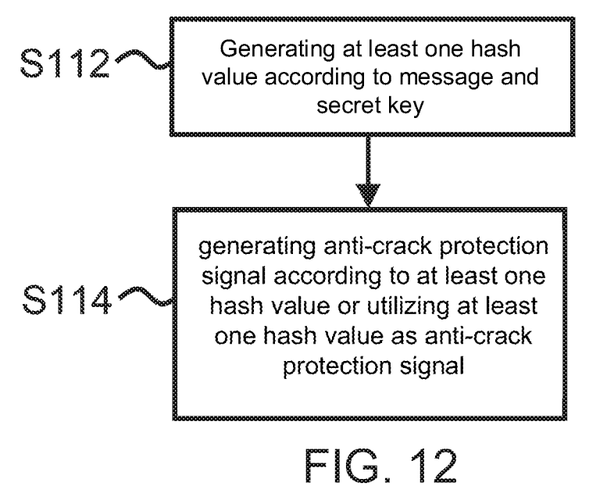
FIG. 12 is a schematic diagram of step S110 in FIG. 11 according to an embodiment of the present invention.

Referring to FIG. 12, to generate an appropriate anti-crack protection signal for step S120, step S110 may include steps S112 and S114.

In step S112, at least one hash value is generated according to the message and the secret key. This step may be performed by the hash calculation circuit 200 in FIG. 2 or an equivalent circuit.

In step S114, the anti-crack protection signal is generated according to the at least one hash value or the at least one hash value is utilized as the anti-crack protection signal. This step may be performed by the shift register processing circuit 300 in FIG. 3 or an equivalent circuit, or may be directly performed by the hash calculation circuit 200 in FIG. 2 or an equivalent circuit.

Further, to ensure that contents of the anti-crack protection signal are non-repetitive in order to increase a protection level for each message, step S110 may include step S116 (not shown) or step S118 (not shown).

In step S116, a shift register process and a logic calculation process are performed according to the message and the secret key to generate the anti-crack protection signal. This step may be performed by the shift register processing circuit 300 in FIG. 3 or an equivalent circuit.

In step S118, in continuation of steps S112 and S114, the shift register process and the logic calculation process are performed according to the at least one hash value to generate the anti-crack protection signal. This step may also be performed by the shift register processing circuit 300 in FIG. 3 or an equivalent circuit.

Figure 13:
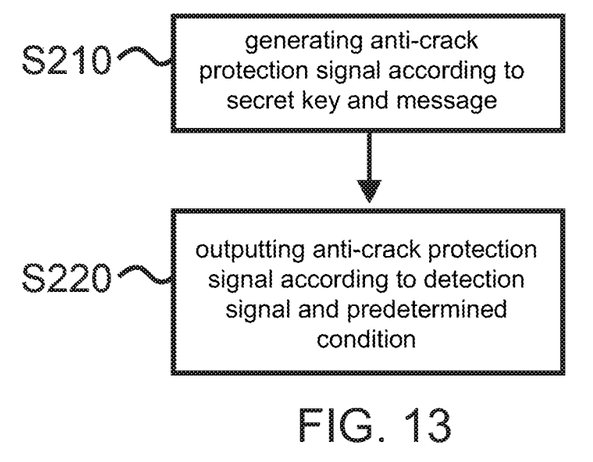
FIG. 13 is a flowchart of a secret key protection method according to an embodiment of the present invention.

The present invention further discloses a secret key protection method that generates an anti-crack protection signal according to a message and a secret key. The anti-crack protection signal is for protecting the message and the secret key. The secret key protection method may be performed by the secret key protection device 900 in FIG. 9 or an equivalent device. As shown in FIG. 13, the secret key protection method according to an embodiment includes steps S210 and S220.

In step S210, the anti-crack protection signal is generated according to the message and the secret key. This step may be performed by the anti-crack protection signal generating circuit 910 in FIG. 9 or an equivalent circuit.

In step S220, the anti-crack protection signal is outputted according to a detection signal and a predetermined condition. The detection signal indicates whether the message is present, and the predetermined condition corresponds to a predetermined time or a progress of generating the anti-crack protection signal. This step may be performed by the status control circuit 130 in FIG. 8 or an equivalent circuit.

Figure 14:
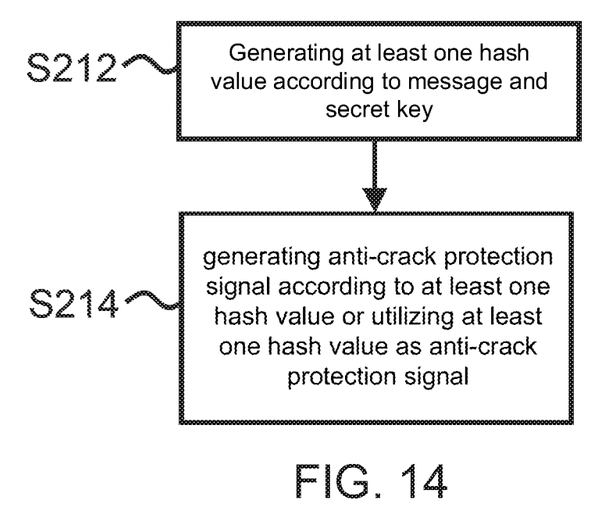
FIG. 14 is a schematic diagram of step S210 in FIG. 13 according to an embodiment of the present invention.

Similarly, as shown in FIG. 14, to generate an appropriate anti-crack protection signal to further protect the message and the secret key, step S210 may further include steps S212 and S214.

In step S212, at least one hash value is generated according to the message and the secret key. This step may be performed by the hash calculation circuit 912 in FIG. 9 or an equivalent circuit.

In step S214, the anti-crack protection signal is generated according to the at least one hash value, or the at least one hash value is utilized as the anti-crack protection signal. This step may be performed by the shift register processing circuit 914 in FIG. 9 or an equivalent circuit, or may be directly performed by the hash calculation circuit 912 in FIG. 9 or an equivalent circuit.

Similarly, to ensure that contents of the anti-crack protection signal are non-repetitive in order to increase a protection level for each message, step S210 may include step S216 (not shown) or step S218 (not shown).

In step S216, a shift register process and a logic calculation process are performed according to the message and the secret key to generate the anti-crack protection signal. This step may be performed by the shift register processing circuit 914 in FIG. 9 or an equivalent circuit.

In step S218, in continuation of steps S212 and S214, the shift register process and the logic calculation process are performed according to the at least one hash value to generate the anti-crack protection signal. This step may also be performed by the shift register processing circuit 914 in FIG. 9 or an equivalent circuit.

It should be noted that, one person skilled in the art can understand details and possible implementation variations of the embodiments of the present invention based on the contents of the embodiments associated with the devices. Without affecting the full disclosure and possible implementation, such repeated description is omitted herein. Further, the embodiments of the present invention are examples for explaining the present invention, not limiting the present invention. In possible implementation, one skilled person in the art would selectively implement part or all technical features of any embodiment of the application or selectively combine part or all technical features of the embodiments of the application based on the disclosure of the present invention. For example, the cryptographic processor 120 in FIG. 1 may process the message and the secret key according to the anti-crack protection signal to generate the anti-crack protection message and the anti-crack protection secret key, respectively, and then process the anti-crack protection message by the anti-crack protection secret key based on characteristics of the anti-crack protection signal at a non-specific time point to obtain the encrypted signal, thereby further enhancing the security.

In conclusion, the cryptographic device and method and the secret key protection device and method disclosed by the present invention are capable of protecting a target message and a secret key by hiding and/or masking means without involving independent/external random number sources, and are also capable of providing sufficient protection without involving a design of equivalent amounts of power consumption or disordered power consumption. In other words, the present invention is capable of guarding against side channel attacks without involving complex or power-consuming circuits, thereby achieving goals of information protection and communication security.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:
1. A cryptographic device as applied to a communication device, that protects a secret key of the cryptographic device when processing a message from a side channel attack, comprising:

a secret key protection circuit, configured to generate an anti-crack protection signal by performing a hash operation on the message and the secret key by a hash calculation circuit; and a cryptographic circuit, configured to encrypt the message into an encrypted message using the secret key at a time determined by the anti-crack protection signal to impede side channel attacks that use differential power analysis.

2. The cryptographic device according to claim 1, wherein the hash calculation circuit generates a hash value according to the message and the secret key, and the secret key protection circuit further comprises:

a shift register processing circuit, configured to generate the anti-crack protection signal according to the hash value; and a buffer, configured to receive the anti-crack protection signal.

3. The cryptographic device according to claim 2, wherein the shift register processing circuit comprises:

a plurality of register units, comprising:

an input register unit, configured to receive the hash value; and an output register unit, configured to output the anti-crack protection signal; and a logic calculation unit, configured to generate a logic calculation value according to the hash value, and to generate the anti-crack protection signal by utilizing the logic calculation value.

4. The cryptographic device according to claim 2, wherein the secret key protection circuit further comprises:

a dummy circuit, configured to obfuscate the energy consumption caused by the shift register processing circuit.

5. The cryptographic device according to claim 1, wherein the hash calculation circuit comprises:

a first hash calculation unit, configured to generate a part of a hash value according to the message; and a second hash calculation unit, configured to generate one other part of the hash value according to the secret key.

6. The cryptographic device according to claim 1, wherein the hash calculation circuit comprises:

a first hash calculation unit, configured to generate an initial hash value according to one of the message and the secret key; and a second hash calculation unit, configured to generate a hash value according to one other of the message and the secret key and the initial hash value.

7. The cryptographic device according to claim 1, further comprising:

a control circuit, configured to control the cryptographic processor and/or the secret key protection circuit according to a detection signal and a predetermined condition, wherein the detection signal indicates whether the message is present, and the predetermined condition corresponds to one of a predetermined time and a speed of generating the anti-crack protection signal.

8. The cryptographic device according to claim 7, wherein the control circuit controls the cryptographic processor according to the detection signal and the predetermined condition to obtain the anti-crack protection signal from the secret key protection circuit, or to control the secret key protection circuit to provide the anti-crack protection signal to the cryptographic processor.

9. A secret key protection method, applied to a cryptographic device applied to a communication device, for protecting a secret key of the cryptographic device when the cryptographic device processes a message from a side channel attack, the secret key protection method comprising:

generating a hash value by performing a hash operation on the message and the secret key;

generating an anti-crack protection signal according to the hash value; and encrypting the message into an encrypted message using the secret key at a time determined by the anti-crack protection signal to impede side channel attacks that use differential power analysis.

10. The secret key protection method according to claim 9, wherein the step of processing the message and the secret key according to the anti-crack protection signal to generate the anti-crack protection message and the anti-crack protection secret key, respectively, comprises:

performing a masking operation on the message and the secret key according to the anti-crack protection signal to generate the anti-crack protection message and the anti-crack protection secret key, respectively.

11. The secret key protection method according to claim 9, wherein the step of generating the anti-crack protection signal according to the hash value comprises:

performing a shift register process according to the hash value to generate the anti-crack protection signal.

12. The secret key protection method according to claim 11, wherein the step of performing the shift register process according to the hash value to generate the anti-crack protection signal comprises:

receiving the hash value;

performing a logic calculation process according to the hash value to generate a logic calculation value; and generating the anti-crack protection signal according to the logic calculation value.

13. The secret key protection method according to claim 11, wherein the step of performing the shift register process according to the hash value to generate the anti-crack protection signal further comprises:

obfuscating energy consumption caused by the shift register process by utilizing a dummy circuit.

14. The secret key protection method according to claim 9, wherein the step of generating the hash value according to the message and the secret key comprises:

generating a part of the hash value according to the message; and generating one other part of the hash value according to the secret key.

15. The secret key protection method according to claim 9, wherein the step of generating the hash value according to the message and the secret key comprises:

generating an initial hash value according to one of the message and the secret key; and generating the hash value according to one other of the message and the secret key and the initial hash value.

16. The secret key protection method according to claim 9, further comprising:

controlling starting time points of the step of generating the anti-crack protection signal and the step of generating the encrypted signal according to a detection signal and a predetermined condition, wherein the detection signal indicates whether the message is present, and the predetermined condition corresponds to one of a predetermined time and a speed of generating the anti-crack protection signal.

* * * * *